US010027566B1

(12) United States Patent
Seeger et al.

(10) Patent No.: US 10,027,566 B1
(45) Date of Patent: Jul. 17, 2018

(54) SIMULATION AND VERIFICATION SYSTEM AND METHOD

(71) Applicant: United States of America as represented by the Administrator of the National Aeronautics and Space Administration, Washington, DC (US)

(72) Inventors: Steven Seeger, Worthington, WV (US); Daniel Nawrocki, Bridgeport, WV (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 702 days.

(21) Appl. No.: 14/335,032

(22) Filed: Jul. 18, 2014

(51) Int. Cl.
*H04L 12/26* (2006.01)
*H04L 5/16* (2006.01)
*H04L 29/06* (2006.01)

(52) U.S. Cl.
CPC ............ *H04L 43/0811* (2013.01); *H04L 5/16* (2013.01); *H04L 43/0864* (2013.01); *H04L 69/18* (2013.01); *H04L 69/28* (2013.01)

(58) Field of Classification Search
None
See application file for complete search history.

(56) References Cited

U.S. PATENT DOCUMENTS

2006/0248208 A1* 11/2006 Walbeck ................. H04L 29/06
709/230
2009/0213850 A1* 8/2009 Viger ..................... H04L 47/10
370/389

* cited by examiner

*Primary Examiner* — Ayaz Sheikh
*Assistant Examiner* — Sori Aga
(74) *Attorney, Agent, or Firm* — Matthew F. Johnston; Bryan A. Geurts; Mark P. Dvorscak

(57) ABSTRACT

A simulation and verification system and method. An interoperability server provides a communications hub for communications between communicating nodes. Nodes connected to a first protocol data bus communicate in a first protocol, e.g., a half-duplex bus protocol. Nodes connected to a second protocol data bus communicate in a second protocol, e.g., a full-duplex bus protocol. A time synchronization bus provides time-frames for synchronizing operation of connected nodes. Interceptors optionally intercept communications between nodes.

8 Claims, 4 Drawing Sheets

SIMULATION AND VERIFICATION SYSTEM AND METHOD

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

Field of the Invention

The present invention is generally related to developing and integrating distributed simulation components and more particularly to a system architecture for independent verification and validation in dynamic analysis and verification and validation, especially for developing and integrating distributed simulation components.

Background Description

National Aeronautics and Space Administration (NASA) has developed software intended for use across multiple NASA missions that employ complex systems. Those missions include, for example, Global Precipitation Measurement (GPM) and the James Webb Space Telescope (JWST). Typical systems required for those missions may have many individual components that must communicate across different, incompatible data and command busses, such as MIL-STD-1553B and SpaceWire. In addition to interoperability problems encountered in translating messages between communications protocols, communicating across these incompatible busses poses complicated timing problems. Thus, insuring a successful mission requires successful communications. Previously, successful communications have not been demonstrable, physically or otherwise, until the system hardware was actually in place.

Thus, there is a need for an independent verification and validation capability for dynamically analyzing communications behavior across multiple different busses, and more particularly, for simulating communications across and between these different busses.

SUMMARY OF THE INVENTION

An aspect of the invention is a modular and hierarchical communications architecture for distributed simulation systems;

Another aspect of the invention is synchronous communications with communications handshaking, thread synchronization across distributed systems, and a capability of dynamically intercepting and modifying data;

Yet another aspect of the invention is an interface for developing software-only simulations;

Yet another aspect of the invention is a consistent and correct data passing mechanism for simulation components and provides system users/developers with an interface for different types of synchronous communications;

Yet another aspect of the invention is a common core layer providing basic interoperability communications and communications capability features;

Yet another aspect of the invention is an interface for a simulated bus for distributed communications acting as a foundation for modular protocol implementations such as MIL-STD-1553B and SpaceWire.

The present invention relates to a simulation and verification system and method. An interoperability server provides a communications hub for communications between communicating nodes. Nodes connected to a first protocol data bus communicate in a first protocol, e.g., a half-duplex bus protocol. Nodes connected to a second protocol data bus communicate in a second protocol, e.g., a full-duplex bus protocol. A time synchronization bus provides time-frames for synchronizing operation of connected nodes. Interceptors optionally intercept communications between nodes.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
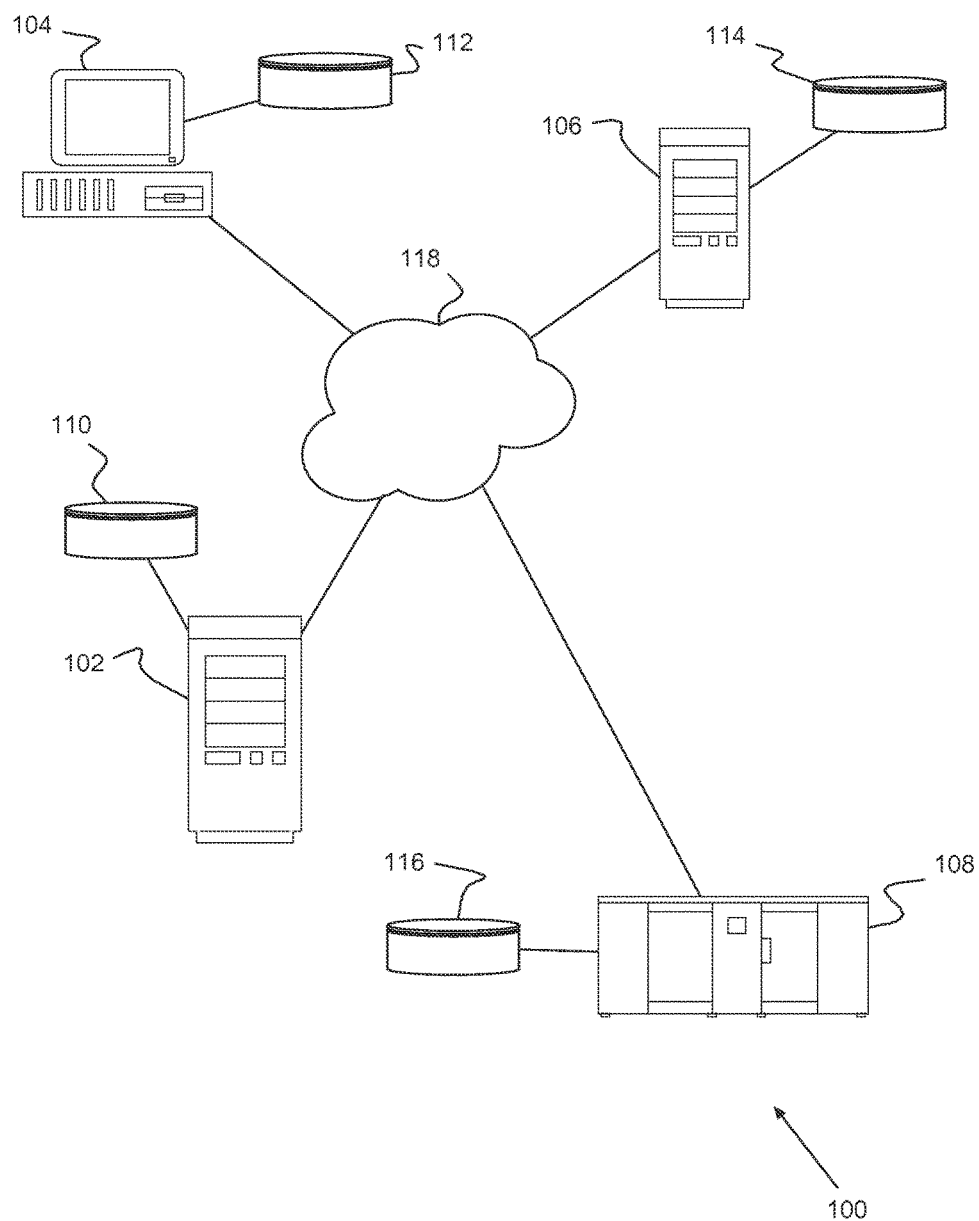
FIG. 1 shows an example of a modular communications architected system for distributed simulation in an independent interoperability test capability according to a preferred embodiment of the present invention.

Turning now to the drawings and more particularly FIG. 1 shows an example of a modular communications architected system 100 for distributed simulation in an independent interoperability test capability according to a preferred embodiment of the present invention. In particular, the present invention provides a consistent and correct data passing mechanism for simulation components and a user interface for different, potentially incompatible communications protocols. In this example, the preferred modular communications architecture 100 includes a server 102 and a collection of client libraries, e.g., distributed in computers 104, 106, 108, providing different functionality levels.

The preferred server 102, also referred to herein as an interoperability server, includes a base layer library 110 defining the server and a base layer. The base layer is a core layer for all upper level layers defined by layer libraries 112, 114, and 116. Each layer library 110, 112, 114, and 116 offers users a corresponding application programming interface (API) for sending and receiving data with all senders blocking while receivers process data. The core and protocol libraries 110, 112, 114, and 116 insure that each layer creates a bus for the respective bus activity and all implementations work with lower layers.

Interoperability server 102 is standalone, and provides a central communications hub for one or more busses with a single thread per bus. The number of busses is limited only by operating system limits on the number of open connections and number of threads. Preferably also, Transmission Control Protocol (TCP) sockets provide the server transport layer. However, the interoperability server 102 is modular to accommodate different transport mechanisms, as necessary, or desired.

The core layer library 110 provides an API to the interoperability server 102 for creating a transmit node, a receive node and bus objects. The interoperability server 102 adds nodes to bus objects that request send tokens for added nodes. As the interoperability server 102 receives data, the library 110 API asynchronously calls node callbacks from a library-owned thread and blocks the system until that callback returns or until a timeout occurs.

The upper layer libraries, also in one or more computers 104, 106, 108 in this example, include a half-duplex bus layer library 112, a full-duplex layer library 114, and a time synchronization layer library 116. The layer libraries 112, 114, and 116 define a half-duplex data bus layer, a full-duplex layer, and a time synchronization layer, shown in individual computers 104, 106, 108 and, connected together on network 118 in this example for example only. It should be noted that in addition to layer libraries 112, 114, and 116, library user/developers also may make custom higher level protocols. Preferably, all higher level protocol libraries are accessible by all participating systems. The higher level protocol libraries 112, 114, and 116 may be in storage on a single computer or any number of computers as desired.

The half-duplex bus layer library 112 models the mechanical, electrical, and functional characteristics of a half-duplex bus to support simulated serially interfaced components, e.g., MIL-STD-1553 components. The half-duplex bus layer library 112 provides bus objects including, for example, remote terminal (RT), bus controller (BC), and subaddress (SA) transmit and receive objects. A user may create subaddresses, add them to remote terminals and add the remote terminals to the bus. The half-duplex bus protocol restricts the ability to transmit. A registered bus controller object, registered with the bus, generates all traffic on the bus. A newly registered bus controller object only succeeds if another bus controller node is not already on the bus.

The full-duplex layer library 114 models a low-latency, full-duplex, point-to-point serial links and packet switching, e.g., as described by SpaceWire (spacewire.esa.int). The full-duplex layer library 114 client API provides for full-duplex, e.g., SpaceWire, busses and nodes. The full-duplex bus nodes autonomously send traffic over the full-duplex bus with the nodes providing simple data received callbacks. The full-duplex layer library 114 also defines router handshake protocol with registered full-duplex bus nodes named and configured with a router endpoint-name.

The time synchronization layer library 116 models a time synchronization layer in a time synchronization bus and provides, for example, bus objects, sender objects and receiver objects. The time synchronization layer objects synchronize multiple receiver objects or connected components on an arbitrary time-frame. A bus can have only one sender object at a time. The sender object sends timing ticks on the bus to receiver objects on the bus. When a receiver object receives a time tick, the receiver object gets a callback. The particular computer, for example 108, may implement a timer, e.g., a flag, to act as the time source on a time sync bus. In this example, the timer is set to send a tick every ten milliseconds (10 ms), provided all receivers acknowledge the tick within the 10 ms following the tick. When each receiver finishes work it waits for, and blocks until, the next tick. If any receivers fail to acknowledge, the timer pauses simulation, allowing the remaining, slower receivers to finish work for that period without hindering system performance. When all receivers finish, all receivers continue to wait and block until the next tick arrives.

Figure 2:
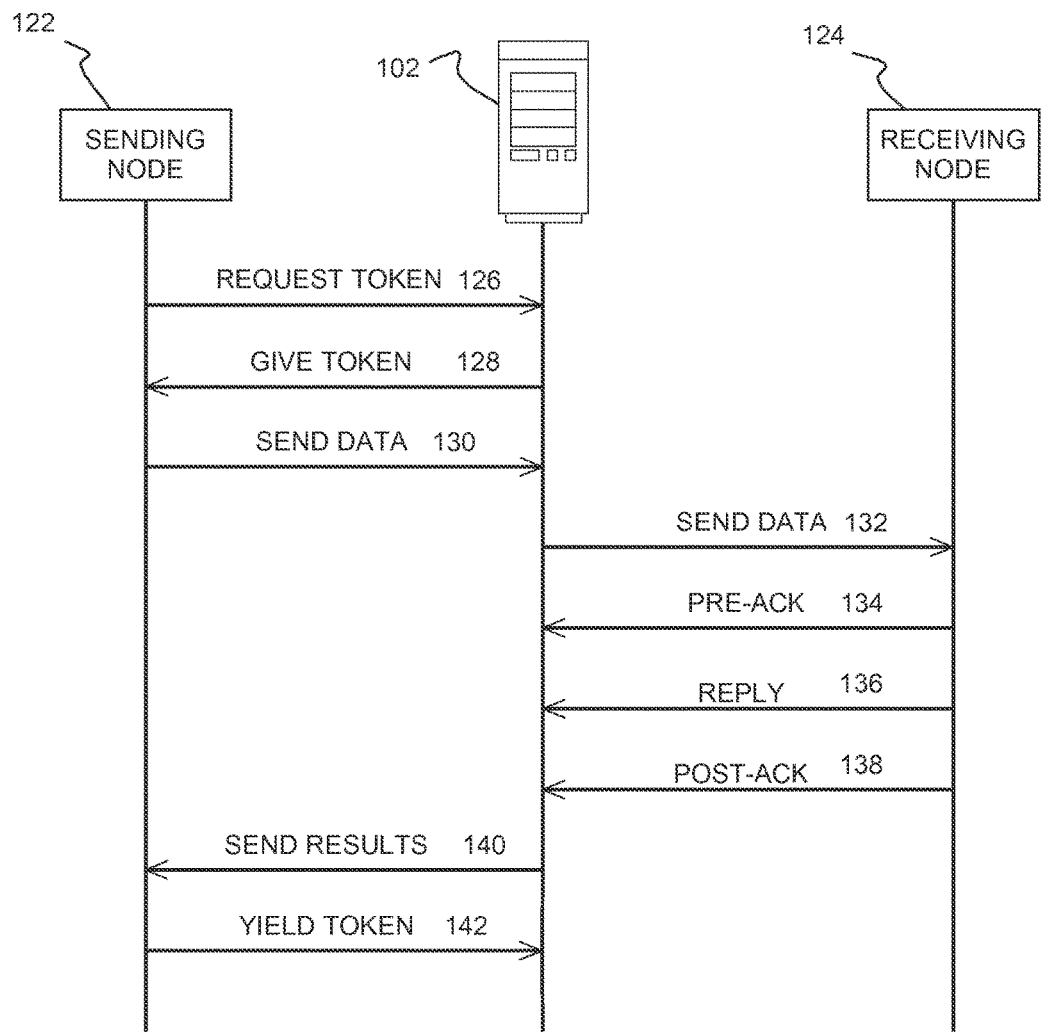
FIG. 2 shows an example of a bus message sequence diagram in a context between 2 nodes.

FIG. 2 shows an example of a bus message sequence diagram 120 in a context between 2 nodes 122, 124 with reference to FIG. 1. Each node 122, 124 may perform read and/or write operations as an endpoint, or may act as an interceptor intercepting (blocking, monitoring, and/or modifying) data passing between endpoints as further described herein below. A reader node, 124 in this example, specifies a respective desired timeout interval for responding. If the response time exceeds the timeout, e.g., if receiving data takes longer than the timeout interval to finish, the interoperability server 102 removes the node. A writer node 122 requests a send token 126, that the interoperability server 102 queues, and releases a token 128 to one writer node 122 at a time, such that only that released node 122 may send data 130. The interoperability server 102 receives data 130 and sends the data 132 to a reader node 124. The reader node 124 responds with a pre-ack 134 to start the timeout period. Also, the reader may send a reply 136. After the reply 136 and when the read is complete, the reader 124 follows with a post-ack 138. The interoperability server 102 responds by sending results 140 to the writer node and the writer node 122 yields the token with a yield 142.

Each client protocol library 112, 114, 116 provides access to each bus and has a different API for interacting with the buses, both as an endpoint node 122, 124 and an interceptor. The API constructs for specific half-duplex bus and full-duplex libraries 112, 114, for example, for those applications map efficiently between the client protocol libraries 112, 114, 116. The client protocol libraries 112, 114, 116 and any interceptors provide a test and analysis structure to facilitate design, development and analysis with selective interception.

The preferred base layer is a core layer for all other layers. In particular, all communications and synchronization functionality is implemented at the base layer. The base layer includes an API to interact with the buses. Protocols that interact with the base layer include respective APIs hide and the base layer from users. The base layer library 110 completely separates server logic from transport with each message represented as a set of bytes. The interoperability server 102 sends request messages through the transport layer and passes received messages to application layers for processing at endpoint nodes 122, 124. The application layers parse packets and bus logic call commands. A "context" is an instance of a transport link in the interoperability server 102. For example, the interoperability server 102 uses TCP sockets transport to create contexts/connections to endpoint nodes 122, 124.

The interoperability server 102 tracks bus contexts of interest. The interoperability server 102 creates a thread to operate a uniquely named bus when a context expresses a first interest. Other contexts expressing interest increase the level of interest in the respective bus. Contexts disconnecting decrease the level of interest in the respective bus. When the interest level reaches zero, the interoperability server 102 removes the bus and its thread. Each bus tracks which contexts own which nodes. So, if a context disconnects, the interoperability server 102 removes nodes from the respective busses, and then, removes the bus interest for that context. The interoperability server 102 can forcibly remove a context from the base layer in response to a node timeout, or at the transport level in response to a message timeout. Even without a timeout, the server transport can close a context, and signal that the context was closed from the other side.

The interoperability server 102 manages each uniquely named bus as a separate thread, obviating the need for bus model synchronization objects such as mutexes. Thus for each bus, the interoperability server 102 funnels all messages received from various contexts through a single work queue. The interoperability server 102 registers each bus node with a unique name for the respective bus, and to a particular context.

So, in this example, when the writer node 122 receives the token 128, it may send data 130 targeted to one or more nodes 124 by name, i.e., as a unicast or targeted delivery. The sender node(s) 122 may also elect to broadcast the data to all nodes. The interoperability server 102 bundles the send data by context, i.e., if a context has multiple nodes on it that are part of the send 130, the interoperability server 102 only sends 130 a single message on the context that indicates all destination nodes 124. The interoperability server 102 also handles interception logic.

The interoperability server 102 expects each context to start processing at least one node within a selected minimum time, e.g., two seconds. The pre-ack 134 indicates to the interoperability server 102 to start tracking a timeout for the respective reader node(s) 124. When each reader node 124 finishes processing, e.g., the reader sends a reply 136 and/or simulation completes for that reader node, the reader returns a post-ack 138. After each post-ack, the context is given another selected time period, e.g., two seconds, to start processing the next node, i.e., the interoperability server 102 waits for a pre-ack 134 or a timeout from the next node. The interoperability server 102 repeats this until all nodes are completed for that context. Multiple contexts may process nodes concurrently. Further, multiple reader nodes may process received data concurrently with the server 102 accepting any and all pre-ack 134 and post-ack 138 pairs, which may be interspersed.

The writer node 122 may receives replies 136 from readers one by one in results 140. Unless there are too many nodes to fit in a single packet, notifications of failed deliveries (i.e., the node is not registered) or node timeouts all come at the same time. If any reader node 124 fails to send a post-ack 138 by the end of the timeout, the interoperability server 102 informs writer node(s) 122 of the timeout, or that the node does not exist on the bus. Thus, the interoperability server 102 culls any reader node that times-out during data reception, i.e., any reader node that fails to respond with a post-ack 138 by the end of the respective timeout. Then, the interoperability server 102 notifies the writer that the reader node was culled. If a reader node times out and blocks its entire context for more than two seconds, the interoperability server 102 closes the entire context. If a reader node disconnects for any reason while it is part of a send, but before the pre-ack, the interoperability server 102 marks the node as undeliverable. If a reader node disconnects after pre-ack, but before processing finishes, the node is undeliverable, but remain in its current state until the end of the timeout. When the writer node 122 finishes, it must yield 142 the token.

Figure 3:
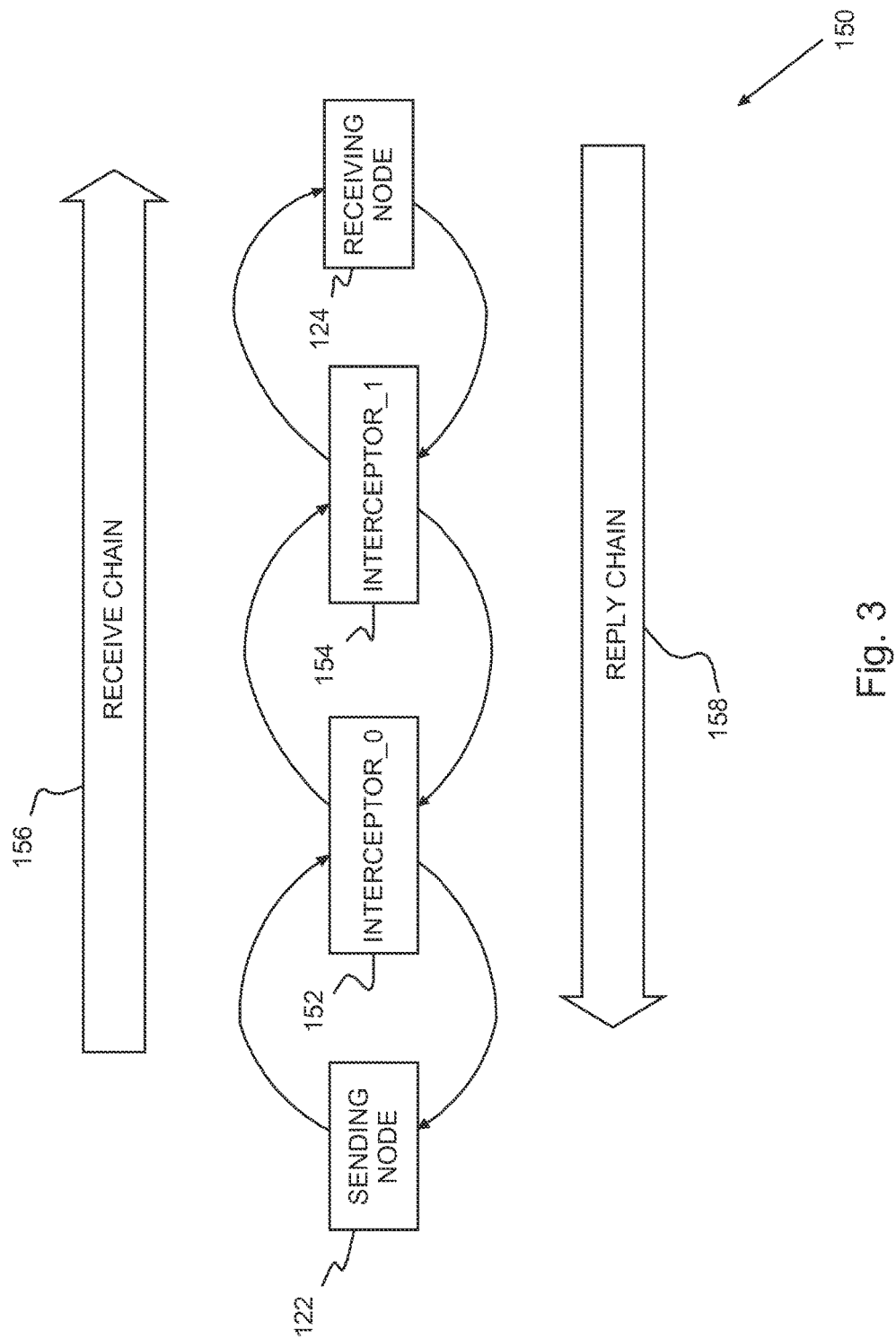
FIG. 3 shows an example of interceptor chaining for interceptor nodes in receive-chain and reply-chain between sending node and receiving node.

FIG. 3 shows an example of interceptor chaining 150 for interceptor nodes 152, 154 in receive-chain 156 and reply-chain 158 between sending node 122 and receiving node 124. Although interceptor nodes 152, 154 are uniquely named, multiple interceptor nodes 152, 154 may intercept the same node. Interceptor nodes 152, 154 may register with the server (102 in FIGS. 1 and 2) before the associated destination nodes 122, 124 register. The receive-chain 156 indicates data flow from a writer or sending node 122 towards a reader or receiving node 124. Similarly, the reply-chain 158 indicates the flow of data from the reader node 124 to the writer node 122.

The interoperability server 102 handles interception logic by targeting an interceptor 152, 154 by name; allowing the interceptor 152, 154 to run; and then, targeting the reader 124 by name. The interoperability server 102 handles a broadcast message by building targeted sends to all receivers intercepted on each round. Thus, clients are not required to handle their own interception logic, which would otherwise difficult where interceptors may not exist on the same context as the destination node(s).

So, the interoperability interoperability server 102 notifies interested interceptor nodes 152, 154 as destination nodes 122, 124 come up or go down, i.e., connect or disconnect. Each interceptor 152, 154 specifies a priority, preferably, highest to lowest, e.g., from 0 to 254. The interoperability server 102 controls the order the interceptors 152, 154 receive data according to priority. In the interoperability server 102 the interception logic functions as a stack, ordering the highest priority interceptors 152 first to intercept data on the receive-chain 156. The lowest priority interceptors 154 are first to intercept data on the reply-chain 158. Thus, every interceptor 152, 154 receives a chance to reply from the node to which it sent data. Interceptor nodes 152, 154 may register with the interoperability server 102 before destination nodes register. If interceptors are not registered for a node, a sender sending data to that node is told the message is undeliverable, because the interceptors do not see the transfer.

The interoperability server 102 handles timing concerns completely. The base layer library 110 provides for server queries to determine if a node is registered and to determine its respective timeout. The base layer provides inter-application synchronization by blocking each sender thread until all other thread nodes have processed the data. This blocking includes the time required to obtain the token, making it possible for a sender thread to block while other prior sends are processed. The sender node must be aware of how much simulation-time, if any, has passed after each send completes. For cases where blocking while the other nodes process the data is unnecessary, the base layer library 110 provides a convenience mechanism to asynchronously request a send token, and handle the send in a callback. For these cases status callbacks are made upon completion to the sender as well. Each sender cannot request another send token until each send completes. The interoperability server 102 also notifies reader nodes if they were disconnected and if that disconnection was due to timeout or an external disconnect command.

Interceptor nodes 152, 154 use base layer codes to signal which action to take with a return value from each callback. The interceptor 152, 154 sends a PASS to the interoperability server 102 to indicate that it is sending unmodified data to the next destination on the chain 156. The interceptor 152, 154 sends a MODIFY to the interoperability server 102 to indicate that the data should be changed as indicated by the MODIFY prior to sending it to the next destination. In the receive-chain 156 the interceptor 152, 154 sends a BLOCK to the interoperability server 102 to abort the rest of the chain 156, to start the reply chain 158, and to pass the data to output buffers as the blocked node reply. On the reply chain, a BLOCK is a convenient method to zero out the reply. Otherwise, there is no actual way to halt the reply chain 158.

Every message is wrapped in a simple socket transport header. Once the interoperability server 102 reads the first byte of a new message, it starts a timer. Preferably, each message includes a size field, an operation identification field, a command field and a payload. Not all operations will have replies. The interoperability server 102 must receive the entire message within the previously allotted timeout time, e.g. two seconds, of the first byte. If not, the interoperability server 102 drops the connection.

The highest order bit of the Operation ID field indicates whether the packet is a reply to a previous send. The Command Code field indicates the type of message. The packet payload includes application level protocol and contains corresponding data.

The half-duplex bus layer library 112 provides for mapping serial communications, preferably, according to the MIL-STD-1553B (1553) specification, interfacing simulated hardware to the base layer. The half-duplex bus layer library 112 interfaces with the base layer through callbacks and primitives, and facilitates both developing new hardware applications and adapting existing hardware applications, as well. Further, the preferred half-duplex bus layer library 112 also may include supporting utilities for the layer. Also, the interceptors may provide other optional features, such as a graphical user interface (GUI) for monitoring traffic on the half duplex bus, or a capability for changing intercepted data to inject faults. The base layer remains completely hidden from connected serial bus layer except for custom transport support.

The half-duplex bus layer library 112 includes bus control and remote terminal interface for simulating unit timing in request responses, e.g., to/from one or more connected units under test. The bus controller allows concurrent development of simulated remote terminals from incomplete hardware models or models being developed. Thus, the present invention provides remote terminal developers with a set of established interfaces, allowing developers to work simultaneously on units for both halves of the simulation irrespective of communications protocol. Thus, a remote terminal (RT) developer need not complete work on a bus controller (BC), because the developer can develop prototype code and drive the prototype with the simulated controller. Similarly, router support may be incomplete even as developing and testing a SpaceWire application progresses.

The preferred full-duplex layer library 114 provides for a router capability for routing packet switching communications e.g., over a SpaceWire bus, with routing information in message headers, which simplifies client handling. All client nodes send messages to a single configurable full-duplex routing application or router. The router determines the network destination node for each packet. The preferred router simulates network topology representing all SpaceWire network routers. Similarly, the preferred full-duplex layer library 114 may include supporting utilities for the layer, and the interceptors may provide other optional features such as a SpaceWire GUI, or a capability for changing intercepted data to inject faults. Thus, the GUIs, e.g., 1553 and SpaceWire, provide visual representations of data and, when coupled with interceptors, e.g., 152, 154, provide a capability for intercepting and modifying data, e.g., to inject faults, between connected components 122, 124.

SpaceWire, for example, exists in both the base layer and the full-duplex layer and uses a client/server approach for SpaceWire routing. This client/server approach means a single node cannot drive the full-duplex layer communications that require client and server cooperation, e.g., a handshake protocol. The base layer remains completely hidden from the full-duplex layer except for custom transport support.

Thus, the full-duplex layer packets include routing information in the messages to determine where on the network to send the packets. It should be noted that the full-duplex layer library 114 does not assist in creating routing headers, as nodes themselves are expected to create routing headers, as compared to a hardware/software router creating those headers.

The full-duplex layer library 114 provides for two busses with a layer between sending and destination nodes handling routing. When one node sends to the router, the router sends to the destination. At this point both the router, as the destination of the sender, is blocking its sender. The actual destination is simultaneously blocking the router. This provides an infinite timeout to account for any possible destination node timeout that may be specified on the bus.

Although only one router may exist at a time on a bus, a single router can support many busses simultaneously. When a node joins the network it sends a message to the router indicating its presence on the network. Nodes are identified by names (e.g., addresses) in the configuration file. The registration handshake ensures each node is known to the router for the bus. If registration fails the failure is indicated in the router log file.

Preferably, the time synchronization layer library 116 provides for a time server generating a pseudo-clock for synchronizing multiple simulated bus components 122, 124. Each bus is limited to a single time server. However, there is no limit on the number of time receivers 122, 124 on a bus. Each component 122, 124 has defined inputs and outputs providing component responses. The simulation time for component responses is independent of the actual hardware component response time. Frequently, for example, two responses on two different components might be timed to arrive coincidentally in hardware. However, multiple simulated components may generate responses serially or at time variance with physical response arrival.

The time for each receiver to acknowledge a tick may vary by the level of work performed by the receiver and the receiver system state. Simulation for hardware that performs calculations in milliseconds, for example, may take several seconds on a computer. This real-time analysis can be performed without skewing the simulation time because all other, faster receivers wait for every other slower node to catch up. Thus, the other components run much slower than they would otherwise with the presence of the slow simulation component(s).

The time server provides a time sync for any required synchronization based on simulation time, instead of communication events. The time sync is analogous to an operation system scheduler interrupt that notifies threads when to run, if ready. Some bus components may conduct work performed in frames, where each frame takes some fixed amount of simulation time. For these components synchronization is extremely important to system functionality, i.e., to maintain components synchronized with each other.

Each bus provides some tick rate, and all bus nodes are expected to have a tick based on some multiple of the tick rate. The time server broadcasts a tick to all components connected to a respective bus. Bus nodes are expected to respond to each tick appropriately. Since the time server establishes time for each entire bus, connected components can process data at whatever pace best suits the components. Bus nodes can register for quick-release ticks, that release the time server immediately, or hold or block further ticks normally until all nodes release the time server. Again, it should be noted that real-time elapse between ticks may vary depending on the time to simulate the corresponding operations occurring between the ticks.

The time sync flow can begin either with all bus nodes performing work from prior to a tick or after all work is complete with all bus nodes waiting for a tick. When the time server sends a tick, the time server blocks issuing further ticks (i.e., holds) until all bus nodes complete processes the tick. When a bus node receives a tick, the node can block while performing work, or immediately acknowledge the tick to signal that the node does not require further processing. Similarly the node acknowledges immediately, to skip ticks while performing work across a multiple of the periodic tick. Holding the time server allows bus nodes registered for notification to complete critical work before the next tick. When a node releases a hold on the time server, that node can continue work until it arrives a point where it is to block the time server again. Because the tick ends when all bus nodes have released the time server, synchronization is at the end of the tick. Thus, every node that completes processing for a tick does not receive another tick until all nodes either timeout or release the time server. This prevents nodes from starting to process in another tick while other nodes have blocked the time server. Accordingly, this time sync prevents out of sync issues by design.

It should be noted that all nodes eventually block waiting for a tick. In this state, the time server can do required work. Then the time server sends a tick, and blocks, allowing all nodes to wake up and do work. The nodes must all complete that work, block, and wait on the next tick when the server wakes up. Further, due to this handshaking, nodes must always be within one frame of each other.

Figure 4:
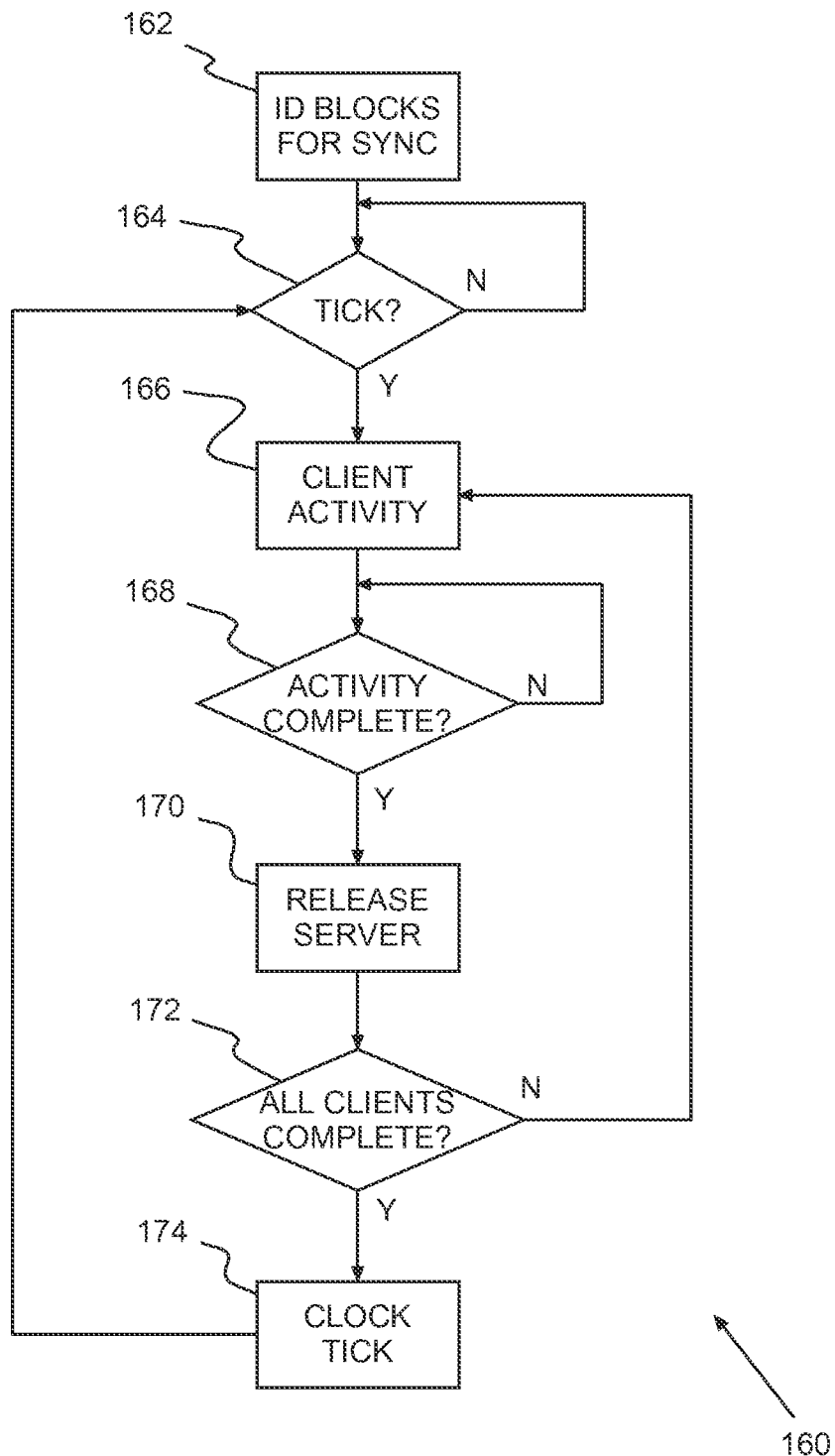
FIG. 4 shows an example of how the time server synchronizes simulated components or units within a time frame.

FIG. 4 shows an example of how the time server synchronizes 160 simulated components or units within a time frame. Each unit identifies 162 corresponding blocks in the simulation for synchronization, preferably on the fly, prior to entering/simulating the blocks. Then, the units wait 164 for the time server to indicate a bus pseudo-clock timing "tick" demarcating a respective clock period, as well as a time count for the period. The time always increments by tick value. However, a different count value may indicate a reset or another abnormal condition. The time server uses a specific destination name that ensures only one active node on a given time sync bus.

At each tick the client begins simulating designated activity 166. The time server waits 168 for all client activity to complete. Essentially, the wait 168 puts a hold on the time server to prevent the current clock period from ending until all clients complete simulated activity for the current time period. Bus nodes may register with a multiplier. The multiplier allows for internal skipping of some number of ticks. For example, if the time server provides a bus tick every five virtual milliseconds, a node with a 15 virtual millisecond period has a multiplier of three. Any node needing a clock rate that is other than a multiple of an existing bus requires a new bus.

When each client completes, the respective client releases 170 the time server. The time server checks 172 whether all clients have completed and continues waiting 168, until released 170 by all clients. When all clients have completed 172, the time server issues next timing tick 174 to start the next clock cycle. In this way the time server synchronizes 160 responses from simulated units that physically occur in the same clock cycle, even where simulated responses arrive sequentially or out of order. Thus even though in real time simulation responses complete at different times, the system treats virtual completion as synchronized, occurring concurrently, in common, regular time intervals.

Time sync units, therefore, must block the time server after receiving tick, when necessary. The time sync library provides for using a condition variable that notifies when to wait for a tick. The internal callback waits for an indication to release the time server, which acknowledges data once the callback returns.

Thus, the modular communications architecture 100 for distributed simulation in the example of FIG. 1 separates protocol-specific implementations from the core. While specific bug fixes may affect all layers, and the core functionality testing for all layers may be done in one place.

Advantageously, a preferred system provides for developing and integrating distributed simulation components and an interface for building simulation systems. Further, a preferred system provides independent verification and validation mechanism for dynamic analysis and verification and validation of NASA missions, especially for developing and integrating distributed simulation components. The data interception capability allows for dynamically testing without modifying existing simulation environments. Moreover, a preferred system provides a consistent and correct data passing mechanism for simulation components, an interface for different types of synchronous communications, and a consistent and correct mechanism to pass data over a half-duplex bus layer. The preferred layered architecture separates protocol-specific implementation from the core bus implementations. Thus, the preferred layered architecture provides for bus specific bug fixes that affect all layers, with core functionality testing for all layers in one place.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of system simulation and verification, said method comprising:
    requesting a token for inter-bus communications from an interoperability server;
    receiving a requested token at a sending node on a first protocol bus responsive to said request;
    sending communications over said first protocol bus to said interoperability server;
    forwarding said communications from said interoperability server to one or more receiving node;
    returning results from each receiving node to said interoperability server;
    yielding said token, wherein another token request is precluded until said token is yielded; wherein said returning results comprises;
    sending a pre-acknowledge from said receiving node to said interoperability server responsive to said forwarded communications; and
    waiting for a post-acknowledge from said receiving node; said results being returned from said interoperability server to said sending node responsive to said interoperability server receiving said post-acknowledge;
wherein a timeout occurs whenever said interoperability server fails to receive said pre-acknowledge or said post-acknowledge within a selected time;
wherein said forwarded communications are directed to a plurality of receiving nodes, and after receiving a first said post-acknowledge, returning results further comprises:
    sending another pre-acknowledge from another said receiving node to said interoperability server responsive to said first post-acknowledge;

waiting for another post-acknowledge from said other receiving node; and returning to sending another pre-acknowledge until receiving a pre-acknowledge from the last said receiving node or until said interoperability server fails to receive said pre-acknowledge from said last receiving node, said results being returned from said interoperability server responsive to said interoperability server receiving the last said post-acknowledge or said last receiving node times out.

2. A method as in claim 1, wherein said interoperability server notifies said sending node of communications failure responsive to a timeout.

3. A method as in claim 1, wherein units on said plurality of receiving nodes are synchronized in an arbitrary timing-frame, synchronizing comprising:

sending a timing tick from a clock server, said timing tick beginning a timing-frame;

beginning simulating execution for one simulated unit;

waiting for an indication from said simulated unit that simulation is complete for a current clock cycle;

receiving in said clock server said indication from said simulated unit;

determining if any units on nodes remain for simulation, and returning to beginning simulating execution for a next unit when said any units remain for simulation; and otherwise returning to sending a next timing tick from said clock server.

4. A method of system simulation and verification said method comprising:

requesting a token for inter-bus communications from an interoperability server;

receiving a requested token at a sending node on a first protocol bus responsive to said request;

sending communications over said first protocol bus to said interoperability server;

forwarding said communications from said interoperability server to one or more receiving node;

returning results from each receiving node to said interoperability server;

yielding said token, wherein another token request is precluded until said token is yielded; wherein said interoperability server includes one or more serially connected interceptors;

sending and forwarding communications comprising passing said communications from at least one node through said one or more serially connected interceptors to receiver nodes; and returning results comprising passing said results from one or more receiver nodes back through said one or more serially connected interceptors to said at least one node.

5. A method as in claim 4, wherein at least one of said one or more serially connected interceptors modifies said communications prior to passing said communications to said receiver nodes.

6. A method as in claim 4, said one or more serially connected interceptors selectively blocking said communications from being passed to one or more of said receiver nodes.

7. A method as in claim 4, wherein at least one of said one or more serially connected interceptors modifies said results prior to passing said results to said at least one node.

8. A method as in claim 4, said one or more serially connected interceptors selectively blocking said results from passing to said at least one node.

\* \* \* \* \*